United States Patent [19]

Labelle

[11] Patent Number: 4,570,532
[45] Date of Patent: Feb. 18, 1986

[54] VENTILATING UNIT FOR ANIMAL BUILDINGS

[76] Inventor: Raymond R. Labelle, R.R. 1, Valcourt, Quebec, Canada, J0E 2L0

[21] Appl. No.: 625,773

[22] Filed: Jun. 28, 1984

[51] Int. Cl.⁴ .............................................. F24F 13/00
[52] U.S. Cl. ...................................... 98/34.5; 236/49
[58] Field of Search ............ 98/33 A, 32, 33 R, 38 R, 98/38 B, 38 C; 236/49, DIG. 9

[56] References Cited

U.S. PATENT DOCUMENTS

| | | | |
|---|---|---|---|
| 2,306,557 | 12/1942 | Otto | 236/49 |
| 2,552,966 | 5/1951 | Harp | 236/49 |
| 3,048,094 | 8/1962 | Bailey | 98/34.5 |
| 3,307,469 | 3/1967 | Bohanon | 98/33 A |
| 3,401,621 | 9/1968 | Aaberg | 98/34.5 |
| 3,468,391 | 8/1969 | Haegens | 236/49 |
| 3,750,557 | 8/1973 | Peill et al. | 98/33 A |
| 4,164,901 | 8/1979 | Everett | 98/33 A |
| 4,336,748 | 6/1982 | Martin et al. | 98/33 A |
| 4,355,566 | 10/1982 | Kaji | 92/13.6 |
| 4,372,197 | 2/1983 | Augsburger | 98/118 |

FOREIGN PATENT DOCUMENTS 2033074 5/1980 United Kingdom .............. 98/33 A

Primary Examiner—Robert E. Garrett
Assistant Examiner—John Kwon
Attorney, Agent, or Firm—Robic, Robic & Associates

[57] ABSTRACT

A ventilating unit particularly suited for animal buildings. The unit comprises a housing with a central exhaust and an intake duct on each side. Flaps are provided for opening or closing the exhaust and intake ducts and partly or fully diverting exhaust air into the intake ducts. The unit, using a single fan, can change air in a building, circulate air in this building, or both change and circulate the air.

3 Claims, 6 Drawing Figures

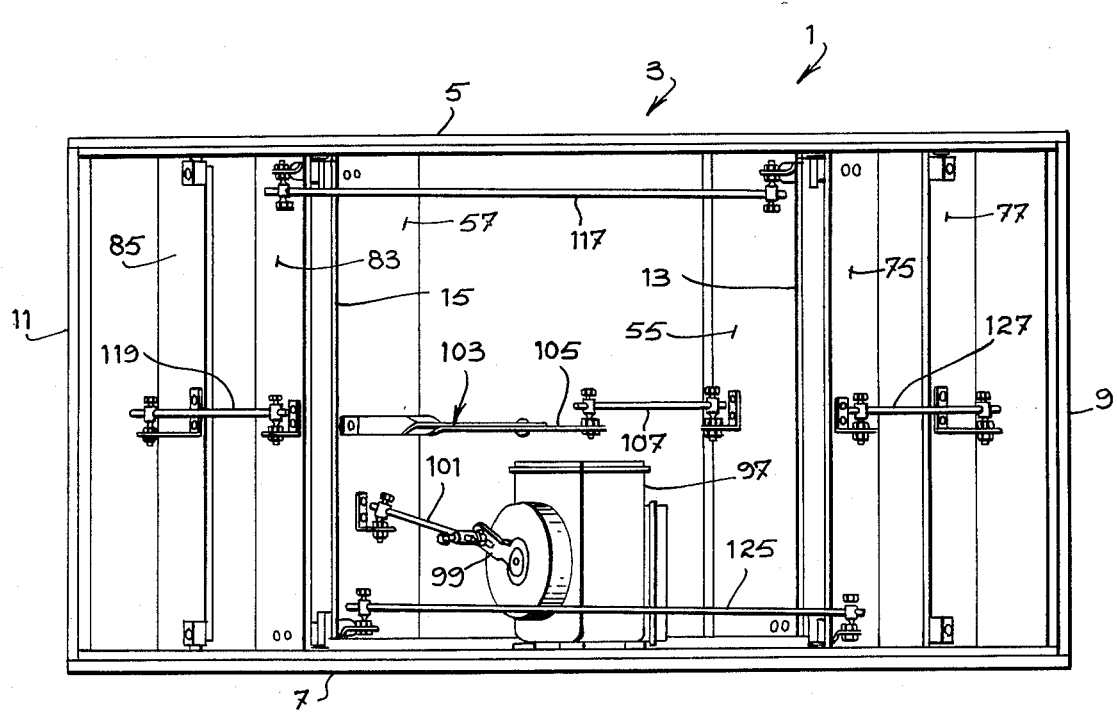
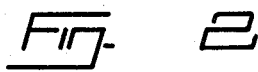
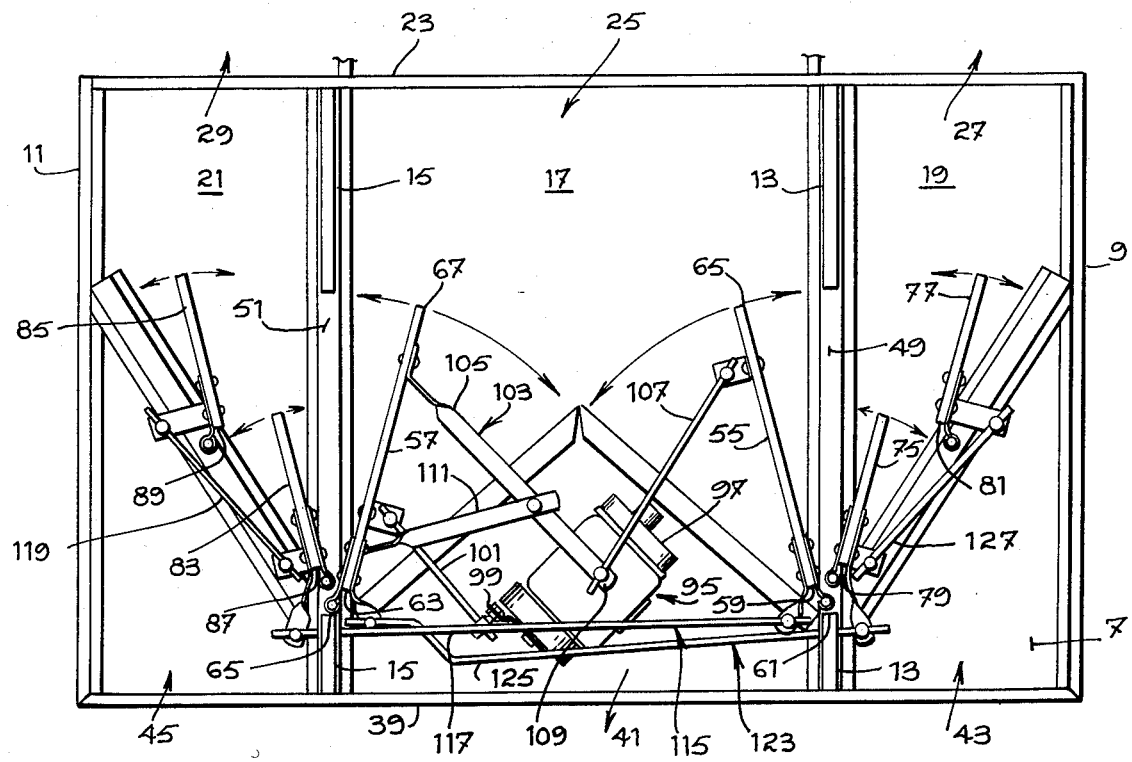

VENTILATING UNIT FOR ANIMAL BUILDINGS

The present invention relates to an improved ventilating unit particularly suited for animal buildings.

It is well known that ventilating units are used in most of the buildings, especially the animal buildings to circulate air in the building, and/or change air in the building. The air circulation step maintains a more uniform air temperature within the building and the air changing step allows introduction of air fresh within the building. In some buildings, such as hog barns, it is particularly important, to protect the health of young pigs, to maintain the air temperature within close limits and also to change the air frequently so that it does not become poisonous from gases generated from pig waste.

In practice, it is rather difficult to change air while keeping the air temperature in the building within desired limits. However, if the incoming fresh air is added generally in the same amount as the amount of stale air removed, and properly mixed with the building air on entering, the building air can be changed while controlling its temperature.

U.S. Pat. No. 4,336,748 issued on June 29, 1982 in the name of Axis Products Ltd., discloses a ventilating unit for both circulating air within a building and/or changing the air in the building while maintaining a relatively constant temperature. The unit employs an air intake duct and an adjacent air exhaust duct, with a fan in each duct. Valve means are provided in the unit for directing any proportion of the air removed from the building via the exhaust duct back into the building via the intake duct. The valve means can be set at any position between, and including, a first position where none of the outgoing air is directed back into the building and a second position where it is all directed back. In the first position, rapid air change occurs, which may be necessary if dangerous air conditions build up within the building. In the second position, no air change occurs, the air within the building being merely recirculated. Normally, the valve means is somewhere between the two positions, allowing some air change while mixing the fresh incoming air with building air to maintain a more stable temperature.

The ventilating unit disclosed in U.S. Pat. No. 4,336,748 works satisfactorily. However, the use of two fans, one in the exhaust duct and one in the intake duct, makes it costly. In addition, the air emerging from the intake duct of this unit is not distributed far enough away from the inlet of the exhaust duct, thereby substantially reducing its efficiency in changing the air. Moreover, the unit cannot be as efficient and/or quiet as it could be due to its asymmetry.

The object of the present invention is to provide an improved ventilating unit which is more efficient and relatively cheaper in cost and operation than the already known units.

In accordance with the present invention, there is provided a ventilating unit for circulating and/or changing air, which unit requires only a single fan. In addition, the unit is constructed to have symmetrical air flow in, and through it, thereby making it more efficient than known units. Further, the unit is constructed to separate the various air flows as they enter or leave the unit as much as possible thereby further increasing efficiency.

In accordance with the present invention, the ventilating unit is provided with a central exhaust duct and an intake duct on each side of the exhaust duct. Air transfer openings are provided between the exhaust duct and each intake duct. A single fan in the inlet of the exhaust duct serves to circulate air and/or change air in a building serviced by the unit. A first valve means is provided in the exhaust duct at its outlet end, and a second valve means is provided in each intake duct at its inlet end. The first and second valve means are movable between, and including: a first position, where both the outlet of the exhaust duct, and the inlets of the intake ducts are closed, and the air transfer openings between the exhaust duct and the intake ducts are opened; and a second position, where the outlet of the exhaust duct, and the inlet of the intake ducts are open and the air transfer openings between the exhaust and intake ducts are closed.

In the first position, the fan circulates the air within the building through the housing with the first valve means symmetrically dividing the incoming air in the exhaust duct for return via the openings and the intake ducts. In the second position, the fan exhausts stale air from the building through the exhaust duct. The reduced pressure within the building draws fresh air in through the intake ducts. Usually the valve means are located in between the two positions thus allowing part of the building air drawn into the exhaust duct to be exhausted, and part to be returned, and mixed, with the replacement fresh air drawn in through the intake ducts. The outlets of the intake ducts are arranged to divert the air laterally of the inlet of the exhaust duct. Similarly the inlets of intake ducts are arranged to draw air in laterally from the unit, and the outlet end of the exhaust duct, to more efficiently change the air.

The invention is particularly directed toward a ventilating unit having a housing with an exhaust duct and first and second intake ducts in the housing, one on each side of the exhaust duct. The exhaust duct has an inlet on one side of the housing and an outlet on the other side of the housing. Each intake duct has an inlet on the other side of the housing and an outlet on the one side. Air transfer openings within the housing connect the exhaust duct to the intake ducts. A fan is provided in the exhaust duct at its inlet for drawing air into the exhaust duct. First valve means are provided in the exhaust duct at its outlet and second and third valve means are provided in the first and second intake ducts respectively at their inlets. Means are provided for moving the first valve means to any position between, and including a first position closing the exhaust outlet and opening the transfer opening, and a second position opening the exhaust outlet and closing the transfer openings. Means are also provided for moving the second and third valve means to any position between and including a first position closing the intake inlets and a second position fully opening the intake inlets. In the first position of the valve means, all the air drawn into the exhaust duct is returned through the intake ducts via the transfer openings and substantially equally divided therebetween. In the second position of the valves means, all the air drawn into the exhaust duct is exhausted and fresh makeup air is drawn in through the intake ducts. In any intermediate position, part of the air drawn in the exhaust duct is exhausted, the remaining part being returned and mixed with fresh air drawn in through the intake ducts.

In accordance with a preferred embodiment of the invention, the ventilating unit is advantageously controlled by a pair of air temperature sensors. The first sensor which is connected to the fan to control its speed, is located at a remote distance from the unit inside the building. The second sensor which is connected to the means used for moving the various valve means to adjust the same between, and including, their first and second respective positions, is advantageously located in the housing, close to the exhaust inlet, to detect the actual temperature of the building air drawn by the fan.

The invention will be better understood upon reading of the following non-restrictive description of a preferred embodiment thereof, made with reference to the accompanying drawings in which:

FIG. 2 is a side elevational view of the ventilating unit of FIG. 1 with the side panel removed;

FIG. 3 is a plan view of the ventilating unit of FIG. 1 with the top panel removed.

Figure 1:
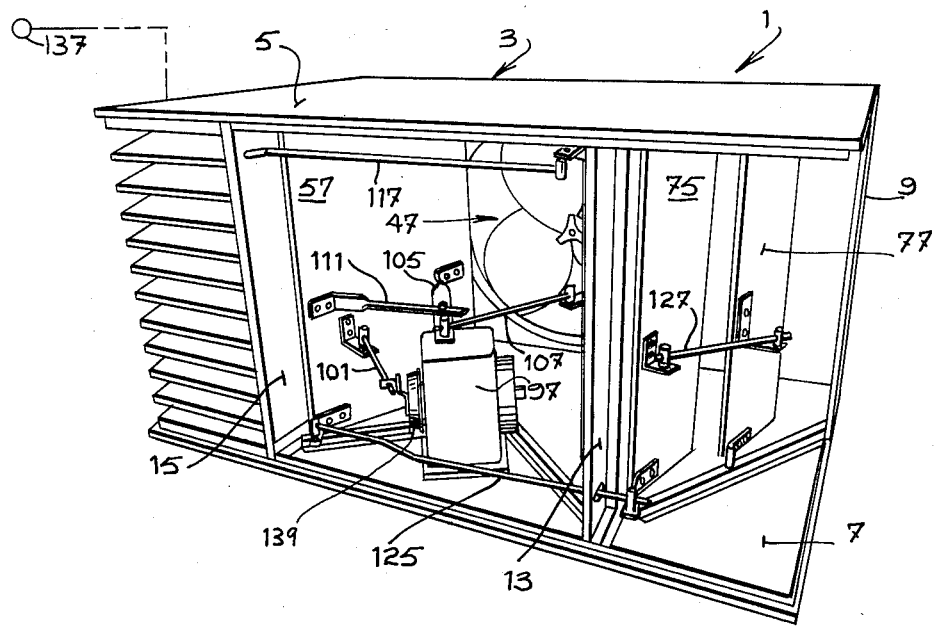
FIG. 1 is a perspective view of a ventilating unit according to the invention.

The ventilating unit 1 shown in FIGS. 1 to 3, has a housing 3 that can be made, for example, of stainless steel. The housing 3 is defined by top and bottom panels 5 and 7 joined by end panels 9 and 11. Two intermediate partitions 13 and 15, extending parallel to the end panels 9 and 11, divide the housing 3 into a central exhaust duct 17 and two intake ducts 19 and 21, one on each side of the exhaust duct 17. The exhaust duct 17 is approximately twice the cross-sectional area of each intake duct 19 and 21.

Figure 4:
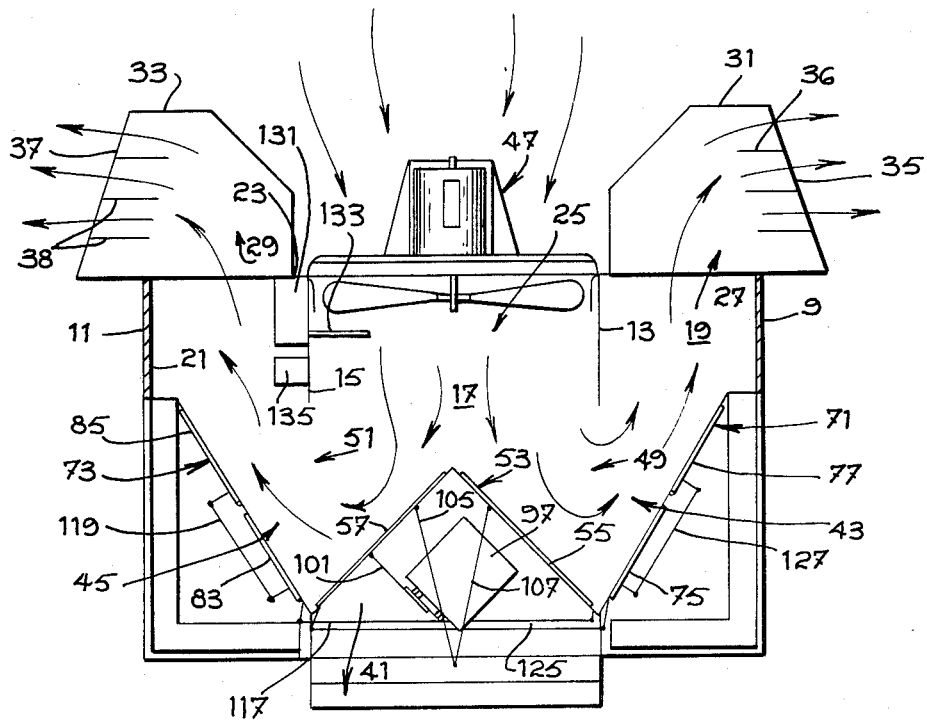
FIG. 4 appearing on the same sheet of drawings as FIG. 1, and FIGS. 5 and 6 are schematic plan views of the ventilating unit of FIGS. 1 and 3, with the top panel removed, showing the valve means in various positions.

One side 23 of the housing 3, namely the inner side of the housing to be located within a building to be serviced by the unit 1, has a central inlet 25 for the exhaust duct 17 and outlet openings 27, 29 for the intake ducts 19, 21. The outlet openings 27, 29 open into cowls 31, 33 mounted on the housing 3 as shown in FIG. 4. The cowls have outlet openings 35, 37 which open sideways to direct air away from exhaust duct 17 in a direction transverse to the end panels 9 and 11 and thus to the axis of the central inlet 25. This particular arrangement is very interesting in that it allows better distribution and circulation of air inside the building. Advantageously, angularly adjustable fins 36 and 38 may be provided in the outlet openings 35 and 37 of the cowls 31 and 33 respectively, for adjustably directing the exhaust air and thus further improving its distribution and circulation inside the building. These fins may be vertical as shown in the drawings, or horizontal or both vertical and horizontal.

On the other side 39 of the housing 3, namely the outer side located outside a building to be serviced by the unit 1, there is a central outlet opening 41 for the exhaust duct 17 and a pair of inlet openings 43 and 45, one on each side of the outlet 37, for the intake ducts 19, 21 respectively. Each inlet opening 39, 41 extends well into the end panels 9, 11 respectively of the housing 3 to draw air into the intake ducts laterally of the housing 3.

A fan 47 is mounted to the housing 3 within the exhaust duct 17 at its inlet opening 25. A first air transfer opening 49 is provided in the partition 13 connecting the exhaust duct 17 to the first intake duct 19, while a second air transfer opening 51 is provided in the partition 15 connecting the exhaust duct 17 to the second intake duct 21.

Figure 5:
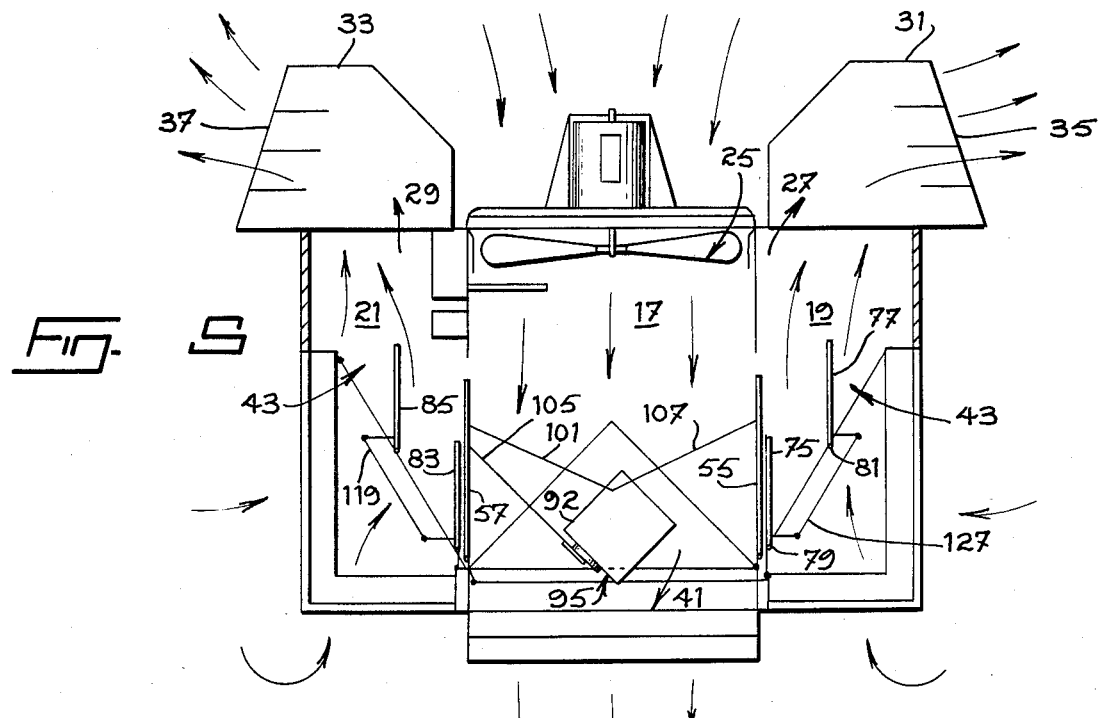

First valve means 53 are provided in the exhaust duct 17 at its outlet 37. This first valve means 53 comprise a pair of flaps 55 and 57. The flap 55 is pivotably mounted at one edge 59 to one edge 61 of the partition 13 defining the transfer opening 49. The flap 57 is pivotably mounted at one edge 63 to one edge 65 of the partition 15 defining the transfer opening 51. The flap 55 is sized to close the first transfer opening 49 whereas the flap 57 is sized to close the second transfer opening 51. The flaps 55 and 57 are movable between a first position where their free edges 65, 67, opposite their one edges 59, 65, abut, the flaps 55, 57 then forming a V-shape as shown in FIG. 4; and a second position, shown in FIG. 5, where the flaps 55 and 57 are parallel to each other. In the first position, the flaps 55 and 57 are parallel to each other. In the first position, the flaps 55 and 57 close the outlet 41 of the exhaust duct 17 and open the air transfer openings 49 and 51 in the partitions 13 and 15. In this position, the flaps 55 and 57 split the incoming air stream in the exhaust duct 17 and divert the air generally equally into the intake ducts 19 and 21 for return to the building via the cowl outlets 35 and 37. Thus, the air is recirculated in the building. In the second position of the flaps 55 and 57 shown in FIG. 5, the exhaust duct outlet 41 is fully opened and the air transfer openings 49 and 51 are closed. The air is now exhausted from the building.

Figure 6:
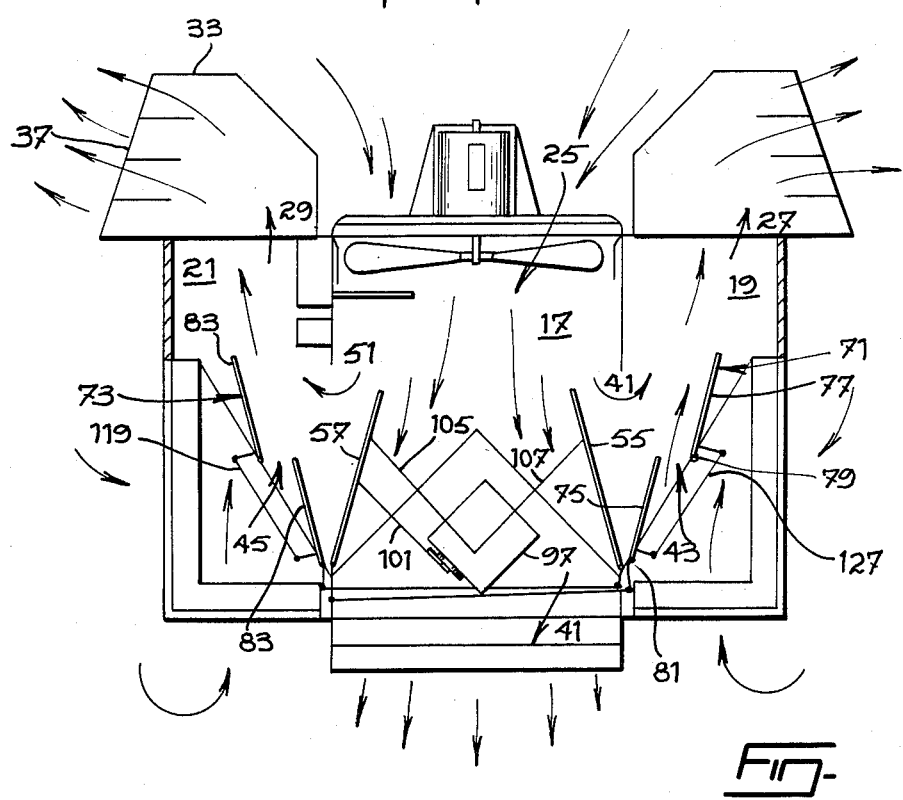

Second and third valve means 71 and 73 are provided in the intake ducts 19 and 21 respectively. The second valve means 71 comprises a pair of flaps 75 and 77 pivotally mounted at one edge 79, 81 respectively in the inlet opening 43 of intake duct 19 between the panels 5 and 7. Similarly, the third valve means 73 comprises a pair of flaps 83 and 85 pivotally mounted at one edge 87, 89 respectively, in the inlet opening 45 of the intake duct 21. The flaps 75, 77 and the flaps 83, 85 are simultaneously movable between, and including, a first position where each pair is aligned and closes the inlet openings 43 and 45 respectively, and a second position where each pair is parallel and opens the inlet openings 43 and 45. In the first position shown in FIG. 4, each pair of flaps 75, 77 and 83, 85 extends at an angle across the intake ducts 19 and 21 respectively that they are mounted in. This position permits the flaps 75, 77 to help divert the air from the flap 55 in the first valve means 53 into the intake duct 19, and the flaps 83, 85 to help divert the air from the flap 57 into the intake duct 21 when the flaps 55, 57 are in their first position. In the second position shown in FIG. 5, the flaps 75, 77 and 83, 85 fully open the intake ducts 19, 21 allowing fresh air to be drawn into the building through the ventilating unit 1 while building air is being exhausted through the exhaust duct 17 with the first valve means 53 in its second position. In any intermediate position as shown in FIG. 6, the flaps 75, 77 and 83, 85 allow part of the building air drawn into the exhaust duct 17 to be exhausted, and part to be returned, and mixed, with fresh air drawn in through the intake ducts 19 and 21. The ratio of the part of building air exhausted through the exhaust duct 17 to the part of this building air returned in, depends on the location of the flaps 75, 77 and 83, 85 in between their first and second positions, and the location of the first valve means 53 in between its first and second positions. In any case, the use of pairs of flaps 75, 77 and 83, 85 instead of single flaps for opening and closing the intake ducts 19 and 21 substantially improves the mixture and distribution of the fresh air drawn in through the intake ducts, with the part of building air selected to be returned in the building.

First means are provided for moving the first valve means 53 between its first and second positions. The first valve moving means 95 comprises a motor 97 mounted to the panel 7 just outside the outlet 41 of the exhaust duct 17. A crank arm 99 is rotated by the motor 97 to move the flap 57 of the first valve means 53 via an actuating arm 101 pivotally connected at its ends to the crank arm 99 and the flap 57. Operation of the crank arm 99 in either direction by the motor 97 moves the flap 57 between its first and second positions.

A connecting linkage 103 between the flaps 57 and 55 allows movement of the flap 57 by the motor 97 to simultaneously move the flap 55 between its first and second positions. The linkage 103 comprises a leading arm 105 fixed at one end to the flap 57 near its outer edge 67, and a following arm 107 pivotally mounted at one end to the flap 55 near its outer edge 65. The arms 105 and 107 extend toward each other to form a V-shaped linkage 103, and are pivotally joined to each other at their other ends by a pivot 109. A brace arm 111 can be provided extending between the flap 57 and leading arm 105.

Second and third means are provided for moving the second and third valve means 71 and 73 between the first and second positions. The second valve moving means 115 preferably comprise linkage means extending from the first valve means 53 to the third valve means 73 to move the third valve means simultaneously with movement of the first valve means 53. The linkage means includes a first link 117 extending from the first flap 55 adjacent its pivot mounting to the edge 87 of the first flap 83 of the third valve means 73. A second link 119 connects the first flap 83 to the second flap 85 of the third valve means 73. Movement of the flap 55 of the first valve means 53 in one direction or the other will move the flaps 83 and 85 of the third valve means 73 simultaneously in the same direction.

The third valve moving means 123 comprises linkage means extending from the first valve means 53 to the second valve means 71 to move the second valve means 71 simultaneously with the movement of the first valve means 53. The linkage means includes a third link 125 extending from the second flap 57 adjacent its pivot mounting to the edge 79 of the first flap 75 of the second valve means 71. A fourth link 127 connects the first flap 75 to the second flap 77 of the second valve means 71. Movement of the flap 57 of the first valve means 53 in one direction of the other, will simultaneously move the flaps 75 and 77 of the second valve means 71 in the same direction.

It will be seen that a single motor 97 is all that is needed to move the first, second and third valve means 53, 71 and 73 in the ducts 17, 19 and 21 respectively and thus to adjust the amount of building air to be exhausted along with the amount of fresh air to be drawn in. As can be understood, the valve means 53, 71 and 73 will usually be located in an intermediate position, between the first and second positions, as shown in FIG. 6, to provide both air circulation and air changing.

In accordance with the invention, the motor of the fan 47 and the motor 97 provided for moving the first, second and third valve means 53, 71 and 73 are independently controlled by a pair of air temperature sensors. The first sensor 137 of this pair is intended to be mounted inside the building at a remote distance from the ventilating unit (for example 15 feet). This first sensor is used exclusively for controlling the speed of the fan 47 which is itself intended to continuously operate under normal conditions. Assuming that the fan 47 is a two-speed fan and an average temperature of 75° F. is desired in the building, the first sensor may be set at a temperature slightly higher than the desired temperature, let say 80° F., to switch the fan 47 to high speed as soon as the ambient temperature detected by the sensor becomes higher than 80°, and to switch it back to low speed as soon as the ambient temperature moves down below 80° F. The first sensor may also be set to completely switch off the fan 47 and thus stop the ventilation as soon as the ambient temperature becomes lower than a predetermined value, like 65° F.

Under normal conditions where the ambient temperature inside the building is higher than the predetermined temperature of 65° F., the fan 47 therefore is operating continuously. Switching of the fan from low to high speed occurs at the preset value of 80° F. At high speed, the fan 47 circulates more air at higher speed and thus improves mixing and distribution of building air and fresh air inside the building.

Since the switching temperature preset in the sensor is slightly higher than the temperature actually desired in the building, the fan 47 is mainly operating at low speed, thereby making it less subject to failure in addition of making the building more comfortable to live in, with much less draught.

The second temperature sensor of the pair of sensors used for controlling the unit 1 is mounted inside the housing 3. This second sensor numbered 131 (see FIG. 4) is preferably mounted on the intermediate partition 15 in such a manner that its probe 133 extends just behind the fan 47 to accurately measure the actual temperature of the building air drawn into the exhaust duct 17.

This second sensor is used exclusively for controlling the respective positions of the valve means 53, 71 and 73 by suitable actuation of the motor 97 in one or the other way via a control circuit 135 (see FIG. 4). This control circuit, may be designed to actuate the motor 97 proportionally to the value and sign of the difference between the desired temperature and the actual building temperature detected by the sensor. However, the control circuit will preferably be designed to incorporate a limiting circuit adjustable from 1° to 4° F., to prevent the valve from being continuously and permanently adjusted.

In combination with the above described control system, the ventilating unit 1 according to the invention constitutes a completely balanced system capable of maintaining a constant temperature inside a building provided that there is sufficient heat. Tests carried out by the inventor in a hog barn have proved that a temperature difference of approximately 3° F. could easily be maintained even in the coldest periods of the year.

Of course, numerous modifications and/or technical additions can be made within the scope of the present invention to the above described unit and system.

By way of example, spring means 139 can be mounted between the shaft of the motor 97 and the crunch arm 99 to automatically open the valve means 53, 71 and 73 in the event of a power failure, to allow ventilation.

Similarly, one or more air quality sensors (not shown) such as a humidistat, may be incorporated into the control system of the unit to provide positioning of the valve means 53, 71 and 73 to obtain from the control of the desired air circulation and/or amount of air change.

I claim:

1. A ventilating unit for use in a building, particularly an animal building, to circulate and/or change air in said building, said unit comprising:
- a housing having one side intended to be located within the building to be serviced and another side to be located outside said building, said housing being partitioned to define a first lateral intake duct, a second lateral intake duct and an exhaust duct centrally positioned between the first and second intake duct, said exhaust duct having an inlet on said one side of the housing and an outlet on said one side of said housing, said housing also having air transfer openings for connecting the exhaust duct to the intake ducts;
- a fan mounted in the inlet of the exhaust duct for drawing air from the building into the exhaust duct;
- first valve means mounted in the housing at the outlet of the exhaust duct, said first valve means comprising a pair of flaps;
- second and third valve means mounted in the housing at the inlets of the first and second intake ducts respectively;
- cowls at the outlets of the intake ducts for directing air in opposite directions away from the inlet of the exhaust duct;
- angularly adjustable fins mounted in the cowls to adjust the distribution and circulation of the air passing through the cowls;
- means for moving the first valve means to any position between, and including, a first position wherein the flaps of said first valve means close the exhaust outlet and leave the transfer openings opened and a second position wherein the exhaust outlet is left opened and said flaps close the transfer openings, said means for moving the first valve means comprising a motor for moving one flap and link means extending between the two flaps for having the one flap move the other flap when the one flap moves;
- means for moving the second and third valves means between, and including, a first position wherein the intake inlets are closed and a second position wherein the intake inlets are opened, said means for moving the second and third valve means comprising first linkage means connecting one of the flaps of the first valve means to the third valve means and second linkage means connecting the other flap of the first valve means to the second valve means,
- a first air temperature sensor to be located at a remote distance from the unit inside the building, said first sensor being connected to the fan to control its speed;
- a second air temperature sensor located in the housing close to the exhaust inlet, said second sensor being connected to the motor used for moving the flaps of the first valve means to adjust the position of said flaps between, and including, their first and second respective positions; and
- an adjustable limiting circuit mounted between the second sensor and the motor used for moving the flaps to prevent said flaps from being continuously and permanently adjusted;
- spring means for automatically opening the valve means in the event of a power failure;
- whereby, in use
  - adjustment of the first, second and third valve means in their first respective positions causes all the air drawn from the building into the exhaust duct by the fan to be returned through the intake ducts via the transfer openings after having been substantially equally divided therebetween;
  - adjustment of said first, second and third valve means in their second positions causes all the air drawn into the exhaust duct by the fan to be exhausted and fresh make up air from the outside to be drawn in through the intake ducts; and
  - adjustment of said first, second and third valve means in intermediate positions between their first and second respective positions causes part of the air drawn in the exhaust duct to be exhausted and part to be returned and mixed with fresh air drawn in through the intake ducts.

2. A ventilating unit as claimed in claim 1, wherein the flaps of the first valve means are sized to form together a V-shape in the first position for deflecting air into the intake ducts through the transfer openings.

3. A ventilating unit as claimed in claim 2 wherein each of said second and third valve means comprises a pair of flaps which, in the first position, are aligned to close the corresponding intake inlet and, in the second position, are parallel to open said corresponding intake inlet.

* * * * *